3,149,113
PREPARATION OF 2-GUANIDINOQUINAZOLINE COMPOUNDS

Joseph Patrick Brown, Llangollen, Wales, assignor to Monsanto Chemicals Limited, London, England, a British company
No Drawing. Filed Jan. 10, 1963, Ser. No. 250,491
Claims priority, application Great Britain Apr. 22, 1959
8 Claims. (Cl. 260—256.4)

This invention relates to quinazolines, and more particularly to 2-guanidinoquinazolines and their salts. Methods for preparation are also part of this invention.

It has been found that when a salt of a 2,2-dialkyl-1,2-dihydroquinoline is treated for instance with dicyandiamide the reaction which might have been expected to take place at the heterocyclic nitrogen atom does not occur, and as a result of a surprising transformation a salt of a 2-guanidinoquinazoline is formed.

The process of the invention is one for the production of a 2-guanidinoquinazoline or its salt which comprises reacting a salt of a 2,2-dialkyl-1,2-dihydroquinoline with dicyandiamide or a derivative of dicyandiamide.

Reaction of a salt of a 2,2-dialkyl-1,2-dihydroquinoline with dicyandiamide or a dicyandiamide derivative normally results in a salt of the 2-guanidinoquinazoline, and where the free 2-guanidinoquinazoline is required this is obtained by treatment of the salt with a base.

The process of the invention is exemplified by the reaction between 2,2,4-trimethyl-1,2-dihydroquinoline hydrochloride and dicyandiamide, represented by the following equation:

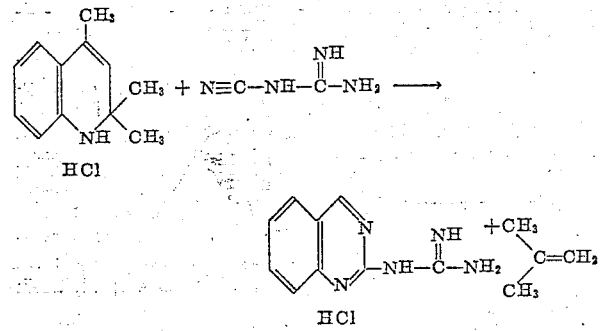

The process is particularly valuable when applied to the production of a 2-guanidinoquinazoline represented by the formula:

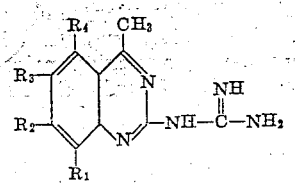

wherein each of $R_1$, $R_2$, $R_3$ and $R_4$ are selected from the group consisting of hydrogen, chlorine, bromine, alkyl having up to four carbon atoms, alkoxy having up to four carbon atoms, phenyl, benzyl, cyclohexyl, phenoxy, benzyloxy and cyclohexyloxy.

The 2-guanidinoquinazolines are preferably produced by reacting the salt of 2,2-dimethyl-1,2-dihydroquinoline and the dicyandiamide or dicyandiamide derivative in a solvent, which can be an aqueous solvent or an organic solvent, such as for instance an alcohol. Ethanol is often a convenient solvent. If water is used as the solvent it is convenient to dissolve the 2,2-dimethyl-1,2-dihydroquinoline in water containing just sufficient of an acid to form a soluble salt. In general, it is convenient to use equimolar proportions of the two reactants and to carry out the reaction by heating under reflux. The salt of 2,2-dimethyl-1,2-dihydroquinoline that is employed in the process should of course be one having an acid radical which does not interfere with the reaction, and examples of suitable salts are hydrochlorides, hydrobromides, hydroiodides, acetates, nitrates and sulphates; the alkyl groups in the gem-2-position are preferably lower alkyl groups, for instance methyl groups.

The starting material can be dicyandiamide itself, in which case the nitrogen atoms in the 2-guanidino group in the resulting quinazoline will be unsubstituted or, where it is desired that a nitrogen atom should carry a substituent, the appropriate N-substituted derivative of dicyandiamide is employed. Suitable dicyandiamide derivatives are for instance those containing an organic group such as an alkyl group, for example one containing up to 4 carbon atoms such as ethyl or propyl, or an aryl group such as phenyl or p-chlorophenyl; other substituents can however be present if desired, for example aliphatic groups which contain amino or cyano radicals or halogen atoms. Examples of derivatives of dicyandiamides which can be used are methyl- and ethyl-dicyandiamides, and 2-aminoethyldicyandiamide. Excellent results have been obtained using dicyandiamide itself. Use of cyanamide in the process also leads to the formation of guanidinoquinazolines, the cyanamide apparently dimerising before reaction takes place.

Conversion of a 2-guanidinoquinazoline salt to a free 2-guanidinoquinazoline can either be carried out directly on the reaction mixture, or the 2-guanidinoquinazoline salt can be isolated and then reacted with an alkaline substance to liberate the free base.

2-guanidinoquinazolines and their derivatives are useful chemical intermediates, as well as having bacteriostatic properties.

Salts of the quinazolines which are useful include the acid-addition salts formed by treating the free quinazolines with an acid such as hydrochloric, hydrobromic or sulfuric acids, or for instance an organic acid such as acetic acid. Also suitable are the quaternary ammonium salts, such as the quaternary chlorides obtained by treating the free base with an alkyl chloride.

Bacteriostatic compositions of the invention which are suspensions can if desired be simple ones of the 2-guanidino-quinazoline in an aqueous medium, stabilized if necessary by the presence of a surface-active agent, for instance a soap or a synthetic surface-active agent such as for example the sodium salt of a long-chain alkylated aromatic sulphonic acid. Alternatively, the 2-guanidinoquinazoline can be dissolved in a suitable organic solvent and before use this solution can then be emulsified in an aqueous medium to give an emulsion of the invention; again this can be stabilized if necessary by a suitable surface-active agent. Such an emulsion is often particularly useful. The organic solvent is preferably immiscible with water, and can for instance be a hydrocarbon, such as for instance toluene, cyclohexane or petroleum ether, or some other organic liquid such as chloroform or chlorobenzene. Animal or vegetable oils such as castor oil, olive oil, sperm oil, cottonseed oil or rape oil, or a mineral oil, are also very suitable. Emulsions can be of the "water-in-oil" type, or can be "oil-in-water." In general, the suspensions and emulsions can be mobile or viscous, and can for example be in the form of a lotion, paste, cream or ointment.

Compositions which are solids can for instance be those in which the inert diluent is a finely-divided powder such as for instance talc.

The proportions of the bacteriostat employed in the compositions will of course vary according to the nature of the compositions and the intended use. In general, it is desirable to incorporate at least 1%, but much larger amounts, for instance 10%, 25% or even 50% can be used, particularly if, as is commonly the case, the composition is a concentrated one intended to be diluted before use.

The compositions of the invention can be employed in any way which makes use of their bacteriostatic properties, for instance in the protection of a variety of materials, including cloth, leather or agricultural products (such as plants, vegetables and fruit) against bacteria and fungi. The invention therefore includes a method for inhibiting the growth of bacteria on a material which normally supports such growth, by treating the material with a 2-guanidinoquinazoline.

Where one of the 2-guanidinoquinazolines is used in soaps, these can be for instance common soap, as well as other soaps derived from natural oils, for example potassium soaps. Waxes in which the 2-guanidinoquinazoline can be used as a bacteriostat can be for instance beeswax, carnauba wax and paraffin wax; wax polishes can also be employed. Synthetic plastics which are suitable include both thermoplastic resins, such as vinyl polymers and copolymers (for instance polystyrene, polyvinyl chloride and polyethylene), and thermosetting resins, for example phenol or melamine resins. In general, the incorporation of from 0.05% to 5% by weight of the bacteriostat is sufficient.

The invention is illustrated by the following examples.

*Example 1*

This example describes the preparation of 2-guanidino-4-methylquinazoline hydrochloride from 2,2,4-trimethyl-1,2-dihydroquinoline and dicyandiamide and the conversion of 2-guanidino-4-methylquinoline hydrochloride to 2-guanidino-4-methylquinazoline.

86.5 grams (0.5 mol.) of 2,2,4-trimethyl-1-2-dihydroquinoline and 42 grams (0.5 mol.) of dicyandiamide were dissolved in a mixture of 270 cc. of water and 52 cc. of concentrated hydrochloric acid (specific gravity 1.16) and the solution was boiled for 2.25 hours. Isobutylene was evolved during the reaction. The reaction mixture was allowed to cool to room temperature and 2-guanidino-4-methylquinazoline hydrochloride crystallized out. The crystals were filtered off, washed with 100 cc. of dilute hydrochloric acid (10% w./v.) and dried at 100° C. for 3 hours. The product consisted of 80.2 grams (68% yield) of 2-guanidino-4-methylquinazoline hydrochloride melting with decomposition at about 320–330° C. A small sample was recrystallized from dilute hydrochloric acid, forming colourless needles which melted with decomposition at 330–332° C. Found: C, 50.6; H, 5.1; N, 29.7%. $C_{10}H_{12}N_5Cl$ requires C, 50.5; H, 5.1; N, 29.9%. The infra-red absorption spectrum of the recrystallized sample was identical with that of a specimen of 2-guanidino-4-methyl-quinazoline hydrochloride prepared by the method described by Theiling and McKee in the Journal of the American Chemical Society, 1952, volume 74, pages 1834 to 1836.

57.5 grams of 2-guanidino-4-methylquinazoline hydrochloride were dissolved in 1 liter of hot water and poured into a solution of 10 grams of sodium hydroxide in 100 cc. of water. A precipitate appeared and was filtered off, washed with 500 cc. of water and dried at 100° C. for 3 hours. The product consisted of 38.2 grams (95% yield) of 2-guanidino-4-methylquinazoline and had a melting point of 243–245° C.

*Example 2*

This example describes the preparation of 6-ethoxy-2-guanidino-4-methylquinazoline and its mono- and dihydrochlorides.

21.7 grams (0.1 mol.) of 6-ethoxy-2,2,4-trimethyl-1,2-dihydroquinoline and 8.4 grams (0.1 mol.) of dicyandiamide were dissolved in a mixture of 65 cc. of water and 10.2 cc. of concentrated hydrochloric acid (specific gravity 1.16) and the solution was boiled for 40 minutes. Isobutylene was evolved during the reaction. The reaction mixture was allowed to cool to room temperature and when cold it separated into an aqueous solution and a sticky oil. The aqueous solution was decanted off and made alkaline by the addition of a solution of 5 grams of sodium hydroxide in 25 cc. of water. A slightly sticky solid appeared, which was filtered off and triturated with hot ethanol to yield 16.8 grams (73% yield) of 6-ethoxy-2 - guanidino - 4 - methylquinazoline. The product was a canary yellow solid having a melting point (with decomposition) of 263–264° C.

6 grams of the product were dissolved in 10 cc. of hot concentrated hydrochloric acid (specific gravity 1.16) and the solution was cooled yielding 5.9 grams of a lemon yellow solid, having a melting point (with decomposition) of 259° C. This was 6-ethoxy - 2 - guanidino - 4 - methylquinazoline dihydrochloride (75.3% yield). A sample of this dihydrochloride was reacted with water to give colorless needles of 6 - ethoxy - 2 - guanidino - 4 - methylquinazoline monohydrochloride, which melted at 250° C. An aqueous solution of the monohydrochloride was made alkaline with hydroxide solution and yielded pure 6 - ethoxy - 2 - guanidino - 4 - methylquinazoline having a melting point (with decomposition) of 268–269° C.

*Example 3*

This example describes the preparation of 6-chloro-2-guanidino - 4 - methylquinazoline hydrochloride from 6-chloro-2,2,4-trimethyl - 1,2 - dihydroquinoline and dicyandiamide.

2.1 grams of 6-chloro - 2,2,4 - trimethyl - 1,2 - dihydroquinoline and 0.85 gram of dicyandiamide were dissolved in a mixture of 6 cc. of water and 1.05 cc. of concentrated hydrochloric acid (specific gracity 1.16) and the solution was boiled for 1 hour. Isobutylene was evolved during the reaction. The reaction mixture was allowed to cool to room temperature and 6 - chloro - 2 - guanidino - 4-methylquinazoline hydrochloride crystallized out. 1 gram of concentrated hydrochloric acid was added and the crystals were filtered off, washed with 5 cc. of dilute hydrochloric acid (10% weight/volume) and dried at 80° C. for 3 hours. The product consisted of 0.5 gram 6-chloro-2-guanidino - 4 - methylquinazoline hydrochloride, melting with decomposition at about 310° C. A small sample was recrystallized from dilute hydrochloric acid, forming colorless needles which melted with decomposition at 310° C. Found: C, 44.55; H, 3.95; N, 26.1; Cl, 25.6%; $C_{10}H_{11}N_5Cl_2$ requires: C, 44.1; H, 4.0; N, 25.7; Cl, 26.1%.

*Example 4*

4,6 - dimethyl - 2 - guanidinoquinazoline hydrochloride was prepared from 2,2,4,6 - tetramethyl - 1,2 - dihydroquinoline and dicyandiamide using the procedure described in Example 3. The product crystallized in the form of colorless prisms having a melting point 303–304° C. (with decomposition). Found: C, 52.1; H, 5.7%; $C_{11}H_{14}N_5Cl$ requires: C, 52.5; H, 5.6%.

The free base was prepared by the action of excess 2 N sodium hydroxide solution on an aqueous solution of the hydrochloride and was a solid having a melting point 256–258° C.

*Example 5*

This example describes the preparation of 8-ethoxy-2-guanidino - 4 - methylquinazoline hydrochloride from 8-ethoxy - 2,2,4 - trimethyl - 1,2 - dihydroquinoline and dicyandiamide, and its conversion to 8 - ethoxy-2-guanidino-4-methylquinazoline.

2.35 grams of 8 - ethoxy - 2,2,4 - trimethyl-1,2-dihydroquinoline and 1.1 grams of dicyandiamide were dissolved in a mixture of 6 cc. of water, 1.3 cc. of concentrated hydrochloric acid (specific gravity 1.16), and 10 cc. of ethanol, and the solution was boiled for 2 hours. Isobutylene was evolved during the reaction. The reaction mixture was evaporated to dryness on a steam bath. The residue partly solidified, and, after cooling, was washed with acetone to remove oily material, leaving 1.45 grams of a greyish solid having a melting point of 301–302° C. (with decomposition). A sample was recrystallized from ethanol, forming off-white needles, having a melting point 301–302° C. (with decomposition). Found: C, 51.1; H, 5.6%; $C_{12}H_{16}ON_5Cl$ requires: C, 51.2; H, 5.7%.

The free base was prepared by the action of excess 2 N sodium hydroxide solution on an aqueous solution of the hydrochloride, and was a solid having a melting point 219–221° C.

*Example 6*

This example describes the preparation of 6-n-butyl-2 - guanidino - 4 - methylquinazoline from 6-n-butyl-2,2,4 - trimethyl - 1,2 - dihydroquinoline and dicyandiamide, and its conversion to 6-n-butyl - 2 - guanidino-4-methylquinazoline hydrochloride.

11.45 grams of 6-n-butyl-2,2,4-trimethyl-1,2-dihydroquinoline and 5 grams of dicyandiamide were dissolved in a mixture of 5.2 cc. of concentrated hydrochloric acid (specific gravity 1.16), and 27 cc. of ethanol and the solution was boiled under reflux for 40 minutes. Isobutylene was evolved during the reaction. The mixture was then concentrated to 20 cc., and 50 cc. of water and excess 2 N sodium hydroxide solution were added. A sticky solid appeared and this was washed with 100 cc. of boiling ethanol, yielding 6-n-butyl-2-guanidino - 4-methylquinazoline having a melting point 198–199° C. Found: N, 27.3%; $C_{14}H_{19}N_5$ requires: N, 27.2%.

Treatment of 6-n-butyl-2-guanidino-4-methylquinazoline with ethanolic hydrogen chloride gave the hydrochloride, which had a melting point 202–203° C.

*Example 7*

This example describes the preparation of 6-tert.-butyl-2-guanidino - 4 - methylquinazoline hydrochloride from 6-tert.-butyl - 2,2,4 - trimethyl - 1,2 - dihydroquinoline and dicyandiamide, and its conversion to 6-tert.-butyl-2-guanidino - 4 - methylquinazoline.

17.45 grams of 6-tert.-butyl - 2,2,4 - trimethyl-1,2-dihydroquinoline and 5 grams of dicyandiamide were dissolved in a mixture of 6.2 cc. of concentrated hydrochloric acid (specific gravity 1.16), and 27 cc. of ethanol and the solution was boiled under reflux for 1½ hours. Isobutylene was evolved during the reaction. The solution was then evaporated almost to dryness on a steam bath, cooled, and washed with 20 cc. of ethanol, yielding 8.3 grams of 6-tert.-butyl - 2 - guanidino - 4 - methylquinazoline hydrochloride in the form of shining pale yellow prisms having a melting point of 298–299° C. (with decomposition). A sample was recrystallized from ethanol to give cream prisms having a melting point 302–303° C. (with decomposition). Found: C, 57.3; H, 6.7; $C_{14}H_{20}N_5Cl$ requires: C, 57.2; H, 6.8%.

The free base was prepared by the action of excess 2 N sodium hydroxide solution or an aqueous solution of the hydrochloride, and was a solid having a melting point 233–235° C.

*Example 8*

6-ethyl-2-guandino-4-methylquinazoline hydrochloride was prepared from 6-ethyl-2,2,4-trimethyl-1,2-dihydroquinoline and dicyandiamide using the procedure described in Example 6. The product crystallized in the form of off-white prisms having a melting point 239–249° C. Found: C, 54.6; H, 6.1%; $C_{12}H_{16}N_5Cl$ requires: C, 54.2; H, 6.0%.

The free base was prepared by the action of excess 2 N sodium hydroxide solution or an aqueous solution of the hydrochloride. It was a pale yellow solid having a melting point 248–249° C. (with decomposition).

*Example 9*

6 - isopropyl-2-guanidino-4-methylquinazoline hydrochloride was prepared from 6-isopropyl-2,2,4-trimethyl-1,2-dihydroquinoline and dicyandiamide using the procedure described in Example 8. The product crystallized in the form of off-white needles having a melting point 233–234° C. with some prior softening. Found: C, 56.0; H, 6.8; N, 24.9%; $C_{13}H_{18}N_5Cl$ required: C, 55.8; H, 6.4; N, 25.0%.

*Examples 10 to 27*

By the reaction of dicyandiamide with a dihydroquinoline the appropriate configuration, any quinazoline with the desired substituents are prepared:

6-ethyl-2-guanidino-4,8-dimethylquinazoline
2-guanidino-6-methoxy-4-methylquinazoline
6,7-dichloro-2-guanidino-4-methylquinazoline
8-ethoxy-2-guanidino-4-methylquinazoline
6,8-diethyl-2-guanidino-4-methylquinazoline
6-bromo-2-guanidino-4-methylquinazoline
2-guanidino-4-methyl-6-phenylquinazoline
8-n-butoxy-2-guanidino-4-methylquinazoline
5-benzyloxy-2-guanidino-4,6-dimethylquinazoline
6,8-di(n-butyl)-2-guanidino-4-methylquinazoline
2-guanidino-4-methyl-6,8-diphenylquinazoline
5-chloro-7-cyclohexyl-2-guanidino-4-methylquinazoline
2-guanidino-4-methyl-6,8-diphenoxyquinazoline
6-cyclohexyloxy-2-guanidino-4-methylquinazoline
6,8-dibenzyl-2-guanidino-4-methylquinazoline
2-guanidino-6-isopropyl-4-methylquinazoline
6,8-di(t-butyl)-2-guanidino-4-methylquinazoline
5-chloro-2-guanidino-8-isopropoxy-4-methylquinazoline

*Example 28*

This example demonstrates the bacteriostatic activity exhibited by 6 - ethoxy-2-guanidino-4-methylquinazoline hydrochloride and various other derivatives of 2-guanidino-4-methylquinazoline hydrochloride.

The minimum concentration of 6-ethoxy-2-guanidino-4-methylquinazoline hydrochloride necessary to inhibit the growth of the bacteria known as *Salmonella typhi* and *Staphylococcus aureus* were measured as follows. 0.5 cc. of a 1% solution of 6-ethoxy-2-guanidino-4-methylquinazoline hydrochloride was incorporated into 25 cc. of a warm Oxoid Nutrient Broth No. 2 agar in a test tube giving a concentration of 0.02% of the compound in the medium. The warm agar was immediately poured into a sterile petri dish and when hard it was streaked with a culture of the first of the test bacteria. A similar procedure was carried out in respect of the second test bacteria, and the two inoculated plates were incubated for 24 hours at 37° C., after which time they were examined for the presence or absence of growth of the organisms. If the bacteria failed to grow at this concentration (that is 0.02%) of 6-ethoxy-2-guanidino-4-methyl-quinazoline hydrochloride the test was repeated at a lower concentration until a concentration was reached at which the organisms were found to grow. In this way, there was found the minimum inhibiting concentration of 6-ethoxy-2-guanidino-4-methylquinazoline hydrochloride for each of the organisms, that is the minimum concentration capable of inhibiting growth of the particular strain of the organism used.

The procedure was then repeated, using derivatives of 2-guanidino-4-methylquinazoline hydrochloride carrying the substituents given in the table below:

| Substituent | Minimum inhibiting concentration (percent) for— | |
|---|---|---|
| | *Salmonella typhi* | *Staphylococcus aureus* |
| 6-Ethoxy | 0.01 | 0.002 |
| 6-Methyl | 0.01 | 0.01 |
| 6-Ethyl | 0.005 | 0.005 |
| 6-Isopropyl | 0.002 | 0.002 |
| 6-n-Butyl | 0.002 | 0.002 |
| 6-t-Butyl | 0.005 | 0.005 |

It can be seen that all the compounds exhibited a marked activity, and the highest inhibiting concentration recorded in any instance was only 0.01%.

This application is a continuation-in-part of abandoned application Serial No. 21,124, filed April 11, 1960, by Joseph Patrick Brown.

What is claimed is:

1. The method which comprises heating at reflux temperatures dicyandiamide and a dihydroquinoline of the formula

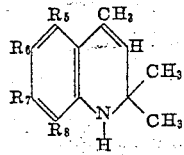

wherein $R_5$, $R_6$, $R_7$ and $R_8$ are selected from the class consisting of hydrogen, chlorine, bromine, alkyl having up to four carbon atoms, alkoxy having up to four carbon atoms, phenyl, benzyl, cyclohexyl, phenoxy, benzyloxy and cyclohexyloxy; to produce a compound of the formula

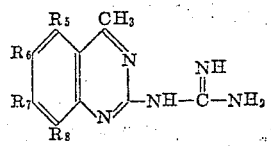

wherein $R_5$, $R_6$, $R_7$ and $R_8$ are as above defined.

2. The method which comprises heating at reflux temperature in the presence of an acid of the class consisting of hydrochloric, hydrobromic, hydroiodic, sulfuric, acetic, and nitric acid, a mixture of dicyandiamide and a dihydroquinoline of the formula

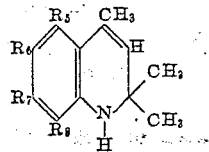

wherein $R_5$, $R_6$, $R_7$ and $R_8$ are selected grom the group consisting of hydrogen, chlorine, bromine, alkyl having up to four carbon atoms, alkoxy having up to four carbon atoms, phenyl, benzyl, cyclohexyl, phenoxy, benzyloxy and cyclohexyloxy; to produce a salt of the above defined acids and a base of the formula

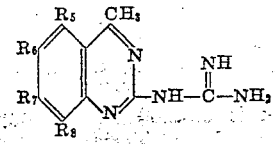

wherein $R_5$, $R_6$, $R_7$ and $R_8$ are as above defined.

3. The method which comprises heating at reflux temperatures in the presence of an acid of the group consisting of hydrochloric, hydrobromic, hydroiodic, acetic, sulfuric and nitric acid a mixture of dicyandiamide and a dihydroquinoline of the formula

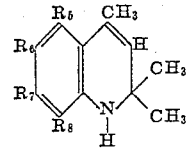

wherein $R_5$, $R_6$, $R_7$ and $R_8$ are selected grom the group consisting of hydrogen, chlorine, bromine, alkyl having up to four carbon atoms, alkoxy having up to four carbon atoms, phenyl, benzyl, cyclohexyl, phenoxy, benzyloxy and cyclohexyloxy; and neutralizing the resulting mixture with sodium hydroxide to produce a compound of the formula

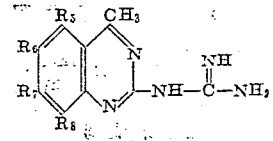

wherein $R_5$, $R_6$, $R_7$ and $R_8$ are as above defined.

4. A method which comprises heating at reflux temperatures dicyandiamide and a dihydroquinoline of the formula

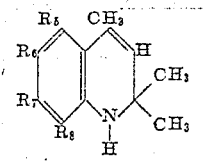

wherein $R_5$, $R_6$, $R_7$ and $R_8$ are selected grom the group consisting of hydrogen, chlorine, bromine, alkyl having up to four carbon atoms, alkoxy having up to four carbon atoms, phenyl, benzyl, cyclohexyl, phenoxy, benzyloxy and cyclohexyloxy; and reacting the resulting base with an acid of the class consisting of hydrochloric, hydrobromic, hydroiodic, acetic, sulfuric and nitric acid; whereby there is formed a salt of the said acids and a base of the formula

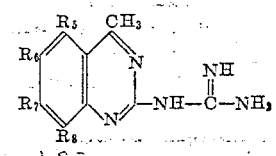

wherein $R_5$, $R_6$, $R_7$ and $R_8$ are as above defined.

5. The method of preparing 6-ethoxy-2-guanidino-4-methylquinazoline hydrochloride, which comprises heating at the reflux temperature a mixture of dicyandiamide and 6-ethoxy-2,2,4-trimethyl-1,2-dihydroquinoline in an aqueous hydrochloric acid medium.

6. The method of preparing 6-ethoxy-2-guanidino-4-methylquinazoline, which comprises heating at the reflux temperature a mixture of dicyandiamide and 6-ethoxy-2,2,4-trimethyl-1,2-dihydroquinoline in an aqueous hydrochloric acid medium, and neutralizing with sodium hydroxide.

7. The method of preparing 6-ethoxy-2-guanidino-4-methylquinazoline hydrochloride which comprises heating at reflux temperature a mixture of dicyandiamide and 6-ethoxy-2,2,4-dimethyl-1,2-dihydroquinoline, and neutralizing the resulting base with aqueous hydrochloric acid.

8. The method of preparing 6-ethoxy-2-guanidino-4-methylquinazoline which comprises heating at reflux temperature a mixture of dicyandiamide and 6-ethoxy-2,2,4-dimethyl-1,2-dihydroquinoline.

References Cited in the file of this patent

UNITED STATES PATENTS 2,625,549    Baker et al.             Jan. 13, 1953